US012671042B2

(12) United States Patent
Hu et al.

(10) Patent No.: US 12,671,042 B2
(45) Date of Patent: Jun. 30, 2026

(54) SOLID-STATE CIRCUIT BREAKER

(71) Applicant: Schneider Electric (China) Co., Ltd., Beijing (CN)

(72) Inventors: Yang Hu, Beijing (CN); Zhigang Han, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 308 days.

(21) Appl. No.: 18/584,110

(22) Filed: Feb. 22, 2024

(65) Prior Publication Data

US 2025/0087436 A1 Mar. 13, 2025

(30) Foreign Application Priority Data

Sep. 11, 2023 (CN) ......................... 202322461890.3

(51) Int. Cl.
*H01H 19/14* (2006.01)
*H01H 19/28* (2006.01)

(52) U.S. Cl.
CPC ............ *H01H 19/14* (2013.01); *H01H 19/28* (2013.01)

(58) Field of Classification Search
CPC .. H01H 3/00; H01H 3/02; H01H 3/08; H01H 3/32; H01H 73/00; H01H 73/02;
(Continued)

(56) References Cited

U.S. PATENT DOCUMENTS 6,104,265 A 8/2000 Maloney et al.
2024/0258057 A1 8/2024 Domejean et al.

FOREIGN PATENT DOCUMENTS

CN 102376498 A 3/2012
CN 113130268 A 7/2021
(Continued)

OTHER PUBLICATIONS

Extended European Search Report dated Oct. 16, 2024 for corresponding European Patent Application No. 24159368.0-1201, 10 pages.

*Primary Examiner* — Anthony R Jimenez
(74) *Attorney, Agent, or Firm* — Quinn IP Law

(57) ABSTRACT

The present disclosure provides a solid-state circuit breaker including a mounting side plate; an operating handle disposed on the mounting side plate and being rotatable relative to the mounting side plate to switch between a closing state and an opening state; a mechanical switch connected to the operating handle, wherein in a case that the operating handle is rotated by a first angle from the closing state along a rotation direction of the operating handle switched from the closing state to the opening state, the operating handle drives the mechanical switch to open; an actuating assembly disposed on the mounting side plate, wherein an end of the actuating assembly abuts against the operating handle, and the actuating assembly is rotatable relative to the mounting side plate under driving of the operating handle; and a microswitch abutting against the other end of the actuating assembly away from the operating handle, wherein in a case that the operating handle is rotated by a second angle from the closing state along the rotation direction of the operating handle switched from the closing state to the opening state, the operating handle drives the actuating assembly to rotate, and the microswitch is triggered by the actuating assembly, and the first angle is greater than the second angle.

20 Claims, 9 Drawing Sheets

(58) Field of Classification Search
CPC ........ H01H 19/00; H01H 19/02; H01H 19/14; H01H 19/28; H01H 19/548; H01H 71/00; H01H 71/10; H01H 71/526; H01H 71/522; H01H 71/46; H01H 71/525
USPC .......................................................... 200/336
See application file for complete search history.

(56) References Cited

FOREIGN PATENT DOCUMENTS

| | | | | |
|---|---|---|---|---|
| CN | 115810519 | A | 3/2023 | |
| EP | 1487002 | A2 * | 12/2004 | ............. H01H 71/70 |
| FR | 3123142 | A1 | 11/2022 | |
| JP | S61099238 | A | 5/1986 | |
| JP | H0249329 | A | 2/1990 | |

* cited by examiner

SOLID-STATE CIRCUIT BREAKER

CROSS-REFERENCE

The present application claims priority to Chinese Patent Application No. 202322461890.3, filed on Sep. 11, 2023, and entitled "SOLID-STATE CIRCUIT BREAKER", the entirety of which is incorporated herein by reference.

FIELD

Embodiments of the present disclosure generally relates to the field of electrical equipment, and more particularly, to a solid-state circuit breaker.

BACKGROUND

A solid-state circuit breaker refers to a switching device that can close, carry, and open a current under a normal circuit condition, and can close, carry, and open a current under an abnormal circuit condition within a specified time. A conventional solid-state circuit breaker includes an operating handle, a mechanical switch, and an electronic switch. In a case that the operating handle is switched from a closing state to an opening state, the electronic switch is first opened, and the mechanical switch is then opened. In a case that the operating handle is switched from the opening state to the closing state, the mechanical switch is first closed, and the electronic switch is then closed.

In a case that the operating handle of the conventional solid-state circuit breaker is switched from the closing state to the opening state, the electronic switch of the conventional solid-state circuit breaker cannot accurately capture a position of the operating handle, resulting in the electronic switch of the solid-state circuit breaker being unable to accurately open the circuit. Therefore, how to accurately capture the position of the operating handle is an urgent problem that needs to be solved.

SUMMARY

An object of the present disclosure is to provide a solid-state circuit breaker to at least partially solve the above problems.

In an aspect of the present disclosure, there is provided a solid-state circuit breaker comprising a mounting side plate; an operating handle disposed on the mounting side plate and being rotatable relative to the mounting side plate to switch between a closing state and an opening state; a mechanical switch connected to the operating handle, wherein in a case that the operating handle is rotated by a first angle from the closing state along a rotation direction of the operating handle switched from the closing state to the opening state, the operating handle drives the mechanical switch to open; an actuating assembly disposed on the mounting side plate, wherein an end of the actuating assembly abuts against the operating handle, and the actuating assembly is rotatable relative to the mounting side plate under driving of the operating handle; and a microswitch abutting against the other end of the actuating assembly away from the operating handle, wherein in a case that the operating handle is rotated by a second angle from the closing state along the rotation direction of the operating handle switched from the closing state to the opening state, the operating handle drives the actuating assembly to rotate, and the microswitch is triggered by the actuating assembly, the first angle is greater than the second angle.

According to embodiments of the present disclosure, the first angle is greater than the second angle, the operating handle is rotated from the closing state to the opening state, in a case that the operating handle is rotated by the second angle from the closing state, the operating handle can drive the actuating assembly to rotate and the microswitch is triggered by the actuating assembly, so that the current in the circuit is opened; the operating handle continues to be rotated, in a case that the operating handle is rotated by the first angle, the operating handle drives the mechanical switch to open.

In summary, on one hand, during the process of switching the operating handle from the closing state to the opening state, the microswitch is triggered before the mechanical switch is opened. Therefore, the mechanical switch can be opened without being charged, thereby avoiding the generation of an electric arc. On the other hand, the actuating assembly abuts against the operating handle, and the actuating assembly abuts against the microswitch, in a case that the operating handle is rotated by the second angle from the closed position, the microswitch is triggered by the actuating assembly. Therefore, the microswitch can directly and accurately capture the position of the operating handle through the actuating assembly, so that the microswitch can accurately open the circuit.

In some embodiments, the actuating assembly comprises a linkage part and a cam disposed at an end of the linkage part near the microswitch, the linkage part abuts against the operating handle, the cam abuts against the microswitch.

In some embodiments, the solid-state circuit breaker further comprises a rotating shaft, the linkage part and the cam are rotatably connected to the mounting side plate through the rotating shaft.

In some embodiments, the linkage part comprises a pair of linkage rods spaced apart from each other and a connecting portion disposed between the pair of linkage rods, an abutting portion is disposed on sides of the pair of linkage rods close to each other, the abutting portion abuts against the operating handle, the cam is disposed at an end of a first linkage rod of the pair of linkage rods close to the microswitch and is located on a side of the first linkage rod away from a second linkage rod of the pair of linkage rods.

In some embodiments, the linkage part further comprises a mounting portion and a reset spring, the mounting portion is disposed at an end of the second linkage rod near the microswitch, and a mounting groove is disposed at an end of the mounting portion away from the cam, the reset spring is arranged around the outer side of the rotating shaft, an end of the reset spring is disposed within the mounting groove, and the other end is fixed inside the solid-state circuit breaker, wherein in a case that the operating handle is switched from the closing state to the opening state, the reset spring is compressed.

In some embodiments, the linkage part comprises a linkage rod comprising a first side and a second side disposed opposite to each other, an abutting portion is disposed on the first side, the abutting portion abuts against the operating handle, the cam is disposed at an end of the linkage rod near the microswitch and is located on the second side.

In some embodiments, the linkage part further comprises a mounting portion and a reset spring, the mounting portion is disposed at an end of the linkage rod near the microswitch and extends along a direction pointing to the second side from the first side, and a mounting groove is disposed at an end of the mounting portion near the cam, the reset spring is arranged around the outer side of the rotating shaft, an end of the reset spring is disposed within the mounting groove, the other end is fixed inside the solid-state circuit breaker, wherein in a case that the operating handle is switched from the closing state to the opening state, the reset spring is compressed.

In some embodiments, the cam comprises a first arc surface, a second arc surface, and a pair of transition surfaces disposed between the first arc surface and the second arc surface, arc centers of the first arc surface and the second arc surface are both located on a central axis of the rotating shaft, and a diameter of the first arc surface is greater than a diameter of the second arc surface.

In some embodiments, the microswitch comprises a switch arm and a switch contact abutting against the switch arm, in a case that the operating handle is in the closing state, the switch arm abuts against the second arc surface, and in a case that the operating handle is rotated by the second angle from the closing state, the switch arm abuts against the first arc surface and presses the switch contact, such that the microswitch is triggered.

In some embodiments, the microswitch comprises a switch arm and a switch contact abutting against the switch arm, in a case that the operating handle is in the closing state, the switch arm abuts against the first arc surface and presses the switch contact, and in a case that the operating handle is rotated by the second angle from the closing state, the switch arm abuts against the second arc surface and releases the switch contact, such that the microswitch is triggered.

It should be understood that the contents described in this section are not intended to limit the key features or important features of the present disclosure, nor are they intended to limit the scope of the present disclosure. Other features of the present disclosure will become readily understood from the following description.

BRIEF DESCRIPTION OF THE DRAWINGS

The above and other features, advantages and aspects of the various embodiments of the present disclosure will become more apparent in conjunction with the accompanying drawings and with reference to the following detailed description. In the drawings, like or similar reference numerals denote like or similar elements, wherein.

DESCRIPTION OF REFERENCE SIGNS

Figure 1:
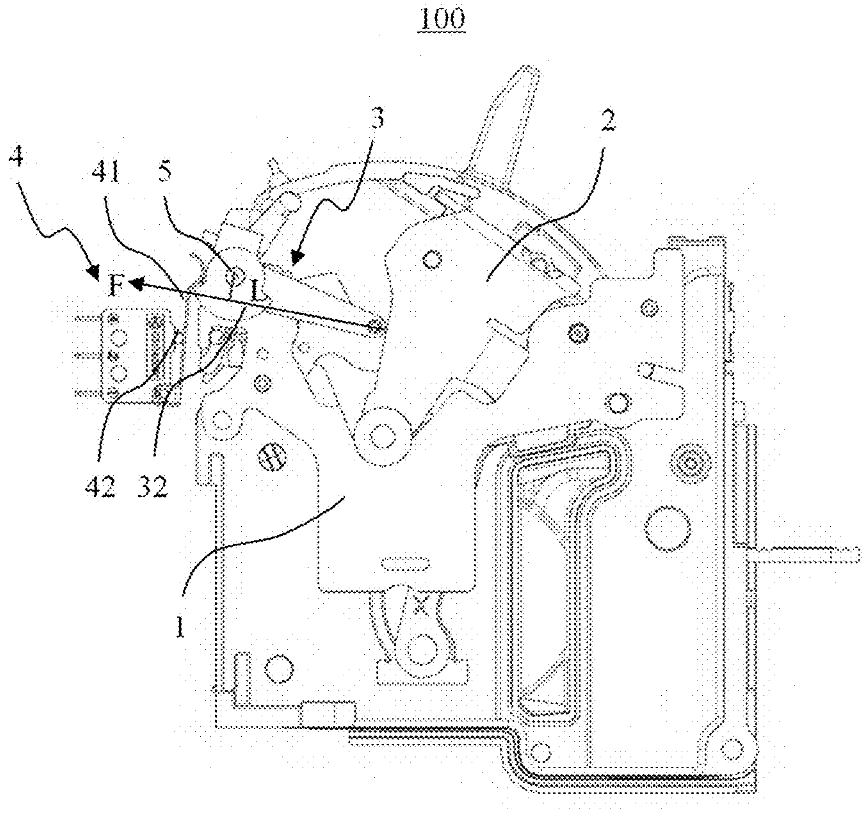
FIG. 1 shows a schematic structural diagram of a solid-state circuit breaker according to some embodiments of the present disclosure, in which the operating handle is in a closing state.

100 represents a solid-state circuit breaker.
1 represents a mounting side plate;
2 represents an operating handle;
3 represents an actuating assembly, 31 represents a linkage part, 311 represents a linkage rod, 3111 represents a first linkage rod, 3112 represents a second linkage rod, 3113 represents a first side, 3114 represents a second side, 312 represents a connecting portion, 313 represents an abutting portion, 314 represents a mounting portion, 3141 represents a mounting groove, 315 represents a reset spring, 32 represents a cam, 321 represents a first arc surface, 322 represents a second arc surface, and 323 represents a transition surface;
4 represents a microswitch, 41 represents a switch arm, 42 represents a switch contact;
5 represents a rotating shaft; 6 represents a mechanical switch; 7 represents an elastic part; 8 represents a connecting rod.

DETAILED DESCRIPTION

The preferred embodiments of the present disclosure will be described in more detail below with reference to the accompanying drawings. Although the preferred embodiments of the present disclosure are shown in the drawings, it should be understood that the present disclosure can be implemented in various forms and should not be limited by the embodiments set forth herein. Instead, these embodiments are provided to make the present disclosure more thorough and complete, and to fully convey the scope of the present disclosure to those skilled in the art.

The term "including" and its variations used in this article indicate open inclusion, that is, "including but not limited to". Unless otherwise stated, the term "or" means "and/or". The term "based on" means "at least partially based on". The terms "one example embodiment" and "one embodiment" mean "at least one example embodiment". The term "another embodiment" means "at least one additional embodiment". The terms "first", "second", etc. can refer to different or identical objects.

As described above, when a conventional solid-state circuit breaker is switched from a closing state to an opening state, an electronic switch of the conventional solid-state circuit breaker cannot accurately open a circuit at an appropriate position. Therefore, how to make the electronic switch of the conventional solid-state circuit breaker accurately open the circuit at the appropriate position is an urgent problem to be solved. In an aspect of the present disclosure, a new type of solid-state circuit breaker 100 is provided to at least partially solve the above problems. Hereinafter, the principles of the present disclosure will be described in conjunction with FIGS. 1 to 13.

Figure 2:
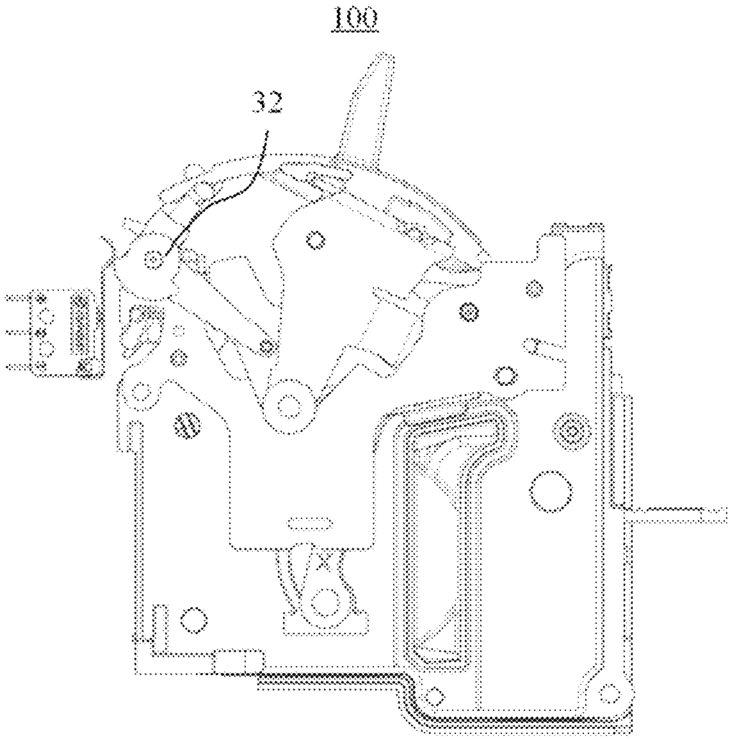
FIG. 2 shows a schematic structural diagram of a solid-state circuit breaker according to some embodiments of the present disclosure, in which the operating handle is rotated by a second angle from the closing state.
Figure 3:
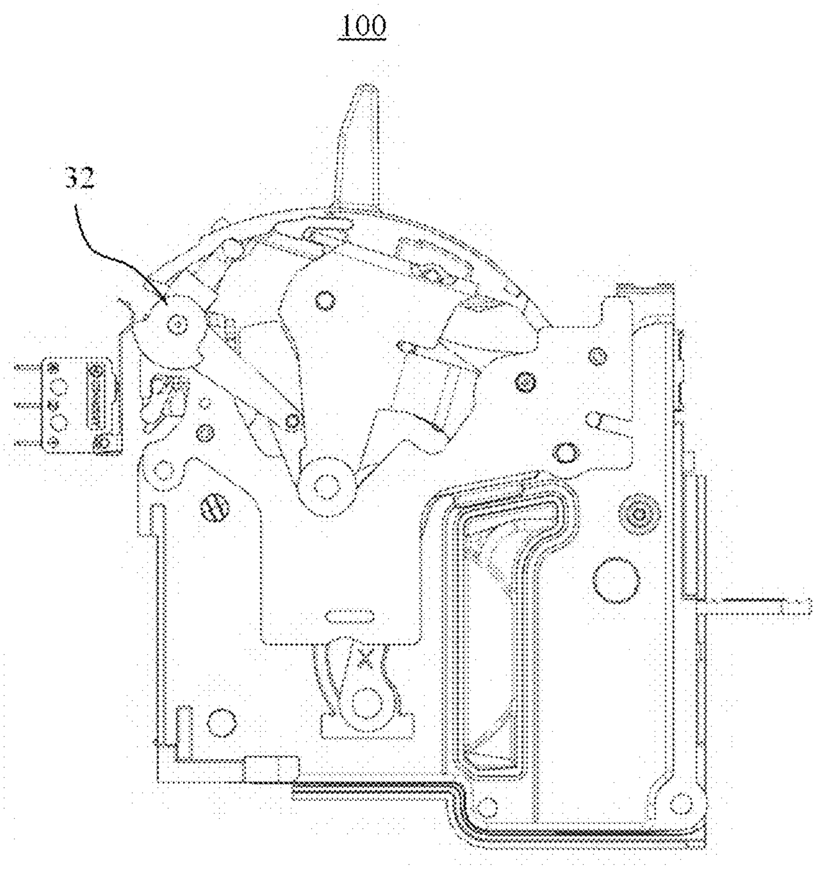
FIG. 3 shows a schematic structural diagram of a solid-state circuit breaker according to some embodiments of the present disclosure, in which the operating handle is rotated by a first angle from the closing state.
Figure 4:
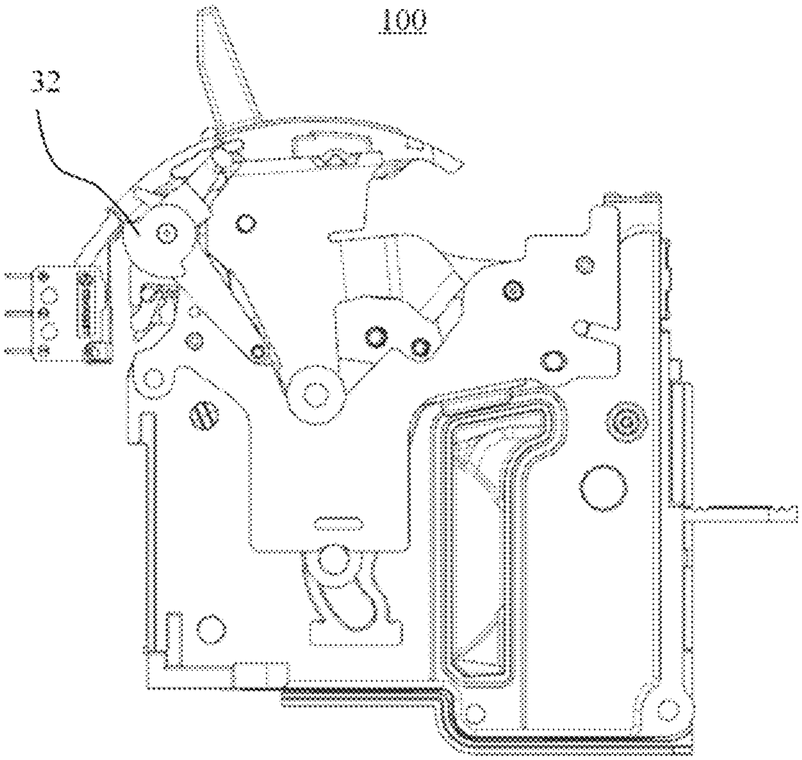
FIG. 4 shows a schematic structural diagram of a solid-state circuit breaker according to some embodiments of the present disclosure, in which the operating handle is in the opening state.
Figure 5:
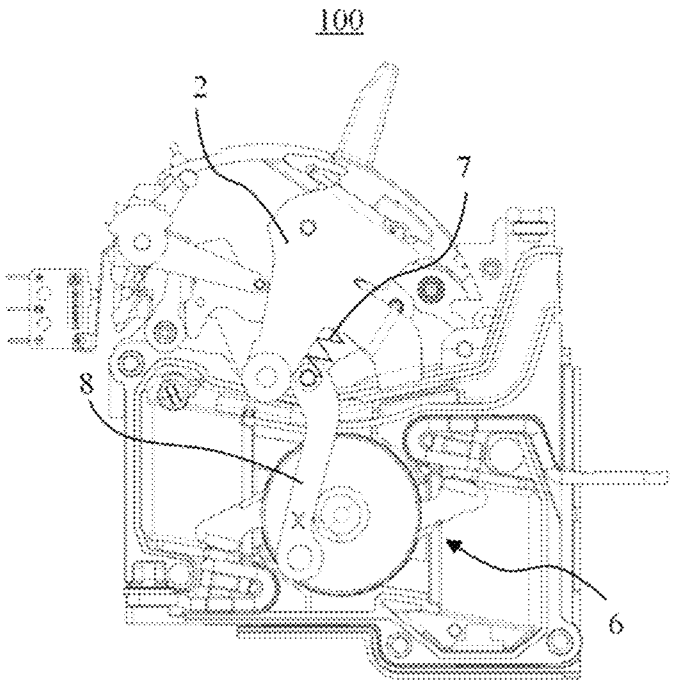
FIG. 5 shows a schematic structural diagram of the solid-state circuit breaker shown in FIG. 1 with the mounting side plate being removed.

FIG. 1 shows a schematic structural diagram of the solid-state circuit breaker 100 according to some embodiments of the present disclosure, in which the operating handle 2 is in a closing state. FIG. 2 shows a schematic structural diagram of the solid-state circuit breaker 100 according to some embodiments of the present disclosure, in which the operating handle 2 is rotated by a second angle from the closing state. FIG. 3 shows a schematic structural diagram of the solid-state circuit breaker 100 according to some embodiments of the present disclosure, in which the operating handle 2 is rotated by a first angle from the closing state. FIG. 4 shows a schematic structural diagram of the solid-state circuit breaker 100 according to some embodiments of the present disclosure, in which the operating handle 2 is in the opening state. FIG. 5 shows a schematic structural diagram of the solid-state circuit breaker 100 shown in FIG. 1 with the mounting side plate 1 being removed to facilitate the display of the mechanical switch 6. As shown in FIGS. 1 to 5, the solid-state circuit breaker 100 described herein generally includes a mounting side plate 1, an operating handle 2, an actuating assembly 3, a microswitch 4, a rotating shaft 5, and a mechanical switch 6. The mounting side plate 1 serves as a mounting carrier for disposing the operating handle 2 and the actuating assembly 3. The operating handle 2 is rotatable relative to the mounting side plate 1 to switch between the closing state and the opening state.

The operating handle 2 of the solid-state circuit breaker 100 in FIGS. 1 to 4 includes four different states among which the operating handle 2 may rotate from the closing state to the opening state. The operating handle 2 in FIG. 1 is in the closing state, in which the mechanical switch 6 is closed. The operating handle 2 in FIG. 2 rotates by the second angle from the closing state, in which the microswitch 4 is triggered by the actuating assembly 3 and the microswitch 4 transmits a signal to a Micro Control Unit (MCU). The MCU receives the signal and opens the current in the circuit. The operating handle 2 in FIG. 3 is rotated by the first angle from the closing state, in which the mechanical switch 6 is opened. The operating handle 2 in FIG. 4 is in the opening state.

As can be seen, the first angle is greater than the second angle, in the process of switching the operating handle 2 from the closing state to the opening state, the microswitch 4 is triggered before the mechanical switch 6 is opened. Therefore, the mechanical switch 6 can be opened without be charged, thereby avoiding generation of an electric arc at its contact position at the moment that the mechanical switch 6 is opened, which may damage the mechanical breakpoint.

Referring to FIG. 5, in some embodiments, the mechanical switch 6 is connected to the operating handle 2. In a case that the operating handle 2 is rotated by the first angle from the closing state along a rotation direction of the operating handle 2 switched from the closing state to the opening state, the operating handle 2 drives the mechanical switch 6 to open. Specifically, the mechanical switch 6 includes a movable contact assembly and a static contact assembly. The operating handle 2 is connected to the movable contact assembly through an elastic part 7 and a connecting rod 8. In a case that the operating handle 2 is in the closing state, the movable contact assembly and the static contact assembly are connected, such that the mechanical switch 6 is closed. In a case that the operating handle 2 is rotated by the first angle from the closing state, the operating handle 2 drives the movable contact assembly to move away from the static contact assembly and separate from the static contact assembly, thereby causing the mechanical switch 6 to open.

Continuing to refer to FIGS. 1 to 5, in some embodiments, an end of the actuating assembly 3 abuts against the operating handle 2, and the other end abuts against the microswitch 4. The actuating assembly 3 is disposed on the mounting side plate 1. The actuating assembly 3 is rotatable relative to the mounting side plate 1 under driving of the operating handle 2. Continuing to refer to FIG. 1, in a case that the operating handle 2 is rotated by a second angle from the closing state along the rotation direction of the operating handle 2 switched from the closing state to the opening state, the operating handle 2 applies a pushing force F to the actuating assembly 3. A lever arm L from a rotation center of the actuating assembly 3 to the pushing force F is small, and a resistance torque is small, therefore the operating handle 2 can drive the actuating assembly 3 to rotate, and the microswitch 4 is triggered by the actuating assembly 3.

According to embodiments of the present disclosure, the two ends of the actuating assembly 3 respectively abuts against the operating handle 2 and the microswitch 4, therefore the microswitch 4 can directly and accurately capture the position of the operating handle 2 through the actuating assembly 3. In a case that the operating handle 2 rotates by the second angle from the closed position, the microswitch 4 is triggered by the actuating assembly 3, thereby the microswitch 4 can accurately open the circuit. In addition, due to the existence of the second angle, in a case that the operating handle 2 is rotated by a small angle, it is possible to avoid the microswitch 4 being triggered, thereby preventing the microswitch 4 from being mistakenly triggered.

There is a certain angle difference between the first angle and the second angle. In some embodiments, the angle difference is 15°. In other embodiments, the angle difference is 20°. The setting of the angle difference gives sufficient preparation time to the microswitch 4, avoiding the situation where in a case that the angle difference is too small, the microswitch 4 has not completed the action after being triggered, but the mechanical switch 6 has been opened, thereby avoiding the generation of an electric arc.

It should be noted that the numbers, values, and numbers mentioned above and elsewhere in this disclosure are exemplary and are not intended to limit the scope of this disclosure in any way. Any other suitable numbers, values, and numbers are possible. For example, depending on the specific application scenario and needs, the angle difference may include a larger or a smaller degree.

Figure 6:
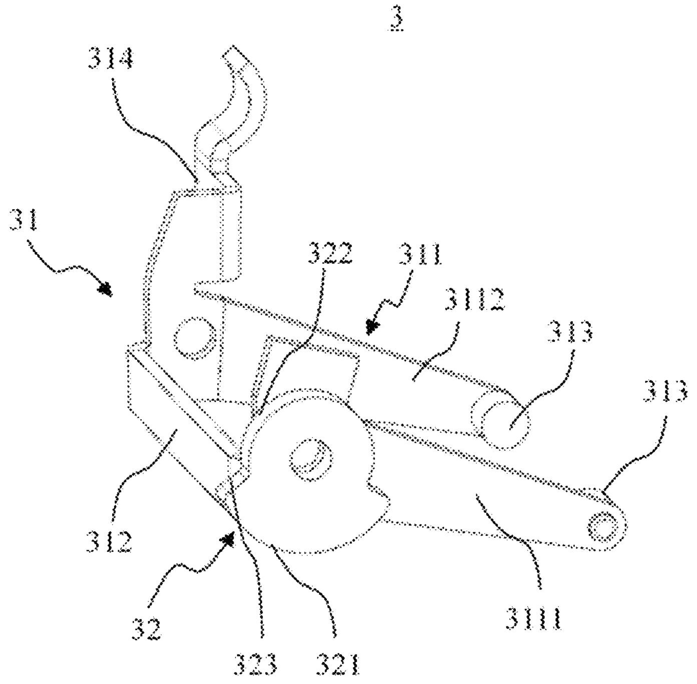
FIG. 6 shows a schematic structural diagram of the actuating assembly shown in FIGS. 1 to 5, in which the reset spring is not shown.

FIG. 6 shows a schematic structural diagram of the actuating assembly 3 shown in FIGS. 1 to 5, in which the reset spring 315 is not shown. In conjunction with FIGS. 1 to 6, in some embodiments, the actuating assembly 3 includes a linkage part 31 and a cam 32, which are fixed with each other and rotate as a whole. The cam 32 is disposed at an end of the linkage part 31 near the microswitch 4. The linkage part 31 abuts against the operating handle 2, and the cam 32 abuts against the microswitch 4. The linkage part 31, the cam 32, and the mounting side plate 1 are provided with rotating holes in communication with each other, respectively. The rotating shaft 5 is disposed within the rotating hole so that the linkage part 31 and the cam 32 are rotatably connected to the mounting side plate 1 through the rotating shaft 5.

Continuing to refer to FIGS. 1 to 6, in some embodiments, the linkage part 31 includes a pair of linkage rods 311 spaced apart from each other and a connecting portion 312 disposed between the pair of linkage rods 311. The connecting portion 312 is used to connect the pair of linkage rods 311. An abutting portion 313 is disposed on sides of the pair of linkage rods close to each other. Since the operating handle 2 includes two side plates, the pair of abutting portions 313 are arranged in correspondence with and abut against the two side plates of the operating handle 2. With the above configuration, a force exerted by the operating handle 2 on the linkage part 31 is relatively uniform, thereby the linkage part 31 can be smoothly driven to rotate, and finally the actuating assembly 3 can be smoothly driven to rotate relative to the mounting side plate 1. The pair of linkage rods 311 include a first linkage rod 3111 and a second linkage rod 3112. The first linkage rod 3111 and the second linkage rod 3112 are spaced apart from each other. The cam 32 is disposed at an end of the first linkage rod 3111 close to the microswitch 4, and the cam 32 is located on a side of the first linkage rod 3111 away from the second linkage rod 3112.

Figure 7:
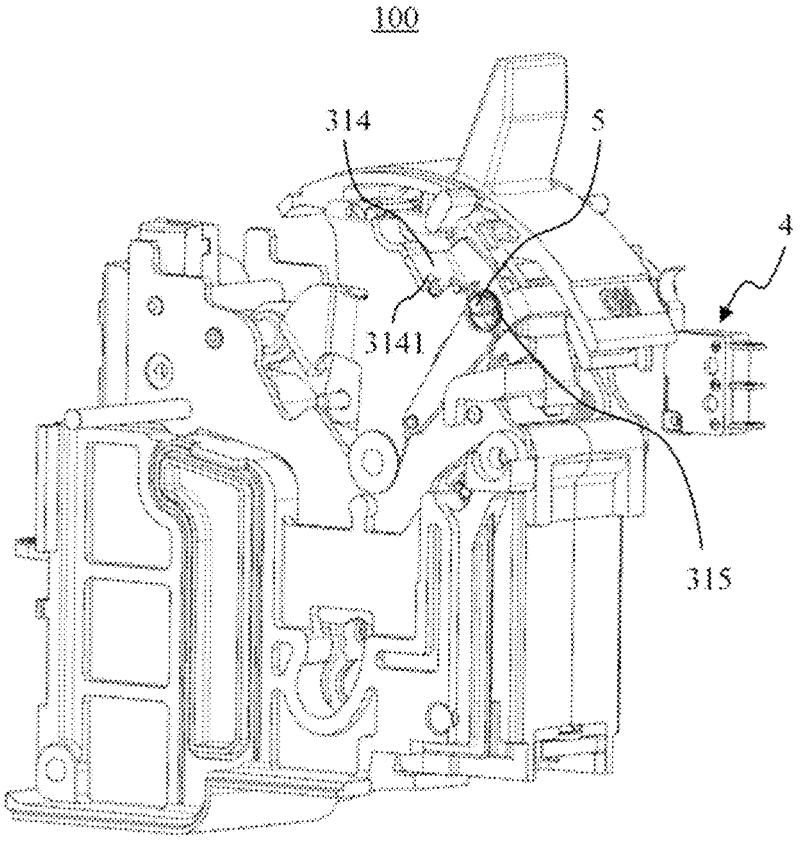
FIG. 7 shows a schematic structural diagram of the solid-state circuit breaker shown in FIG. 1 from another perspective.

FIG. 7 shows a schematic structural diagram of the solid-state circuit breaker 100 shown in FIG. 1 from another perspective. Continuing to refer to FIGS. 1 to 7, in some embodiments, the linkage part 31 further includes a mounting portion 314 and a reset spring 315. The mounting portion 314 is disposed at an end of the second linkage rod 3112 near the microswitch 4, and a mounting groove 3141 is disposed at an end of the mounting portion 314 away from the cam 32. The mounting groove 3141 is used to fix an end of the reset spring 315. An end of the rotating shaft 5 away from the cam 32 extends through the second linkage rod 3112, and the reset spring 315 is arranged around the outer side of the end of the rotating shaft 5 extending through the second linkage rod 3112. An end of the reset spring 315 is disposed within the mounting groove 3141, the other end is fixed to a component inside the solid-state circuit breaker 100, and the end of the rotating shaft 5 extending through the second linkage rod 3112 is located between the two ends of the reset spring 315. In a case that the operating handle 2 is switched from the closing state to the opening state, the linkage rod 311 in FIG. 7 moves downward, and the reset spring 315 is compressed by force. In a case that the operating handle 2 is switched from the opening state to the closing state, since the linkage rod 311 is not connected to the operating handle 2, the operating handle 2 cannot drive the linkage rod 311 to reset. Therefore, the linkage rod 311 moves upward by the force released by the reset spring 315 and abuts against the operating handle 2.

Figure 8:
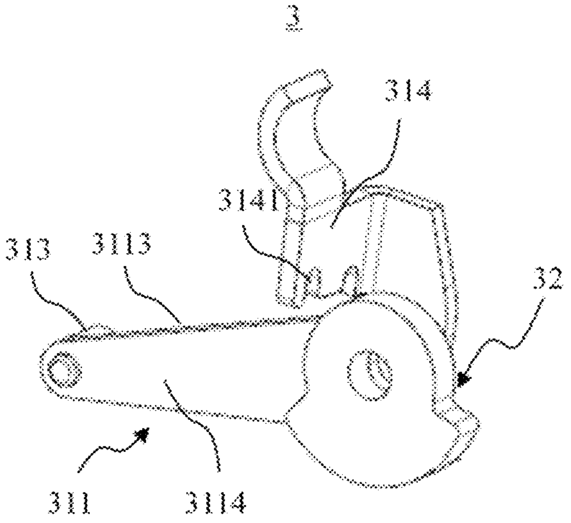
FIG. 8 shows a schematic structural diagram of an actuating assembly according to other embodiments of the present disclosure, in which the reset spring is not shown.

FIG. 8 shows a schematic structural diagram of the actuating assembly 3 according to other embodiments of the present disclosure, in which the reset spring 315 is not shown. In other embodiments, the number of the linkage rod 311 is one. The linkage rod 311 includes a first side 3113 and a second side 3114 disposed opposite to each other. An abutting portion 313 is disposed on the first side 3113, and the abutting portion 313 abuts against one of the side plates of the operating handle 2. The cam 32 is disposed at an end of the linkage rod 311 near the microswitch 4 and is located on the second side 3114.

Continuing to refer to FIG. 8, in other embodiments, the linkage part 31 further includes a mounting portion 314 and a reset spring 315. The mounting portion 314 is disposed at an end of the linkage rod 311 near the microswitch 4 and extends along a direction pointing to the second side 3114 from the first side 3113. A mounting groove 3141 is disposed at an end of the mounting portion 314 near the cam 32. The mounting groove 3141 is used to fix an end of the reset spring 315. The reset spring 315 is arranged around an outer side of an end of the rotating shaft 5 extending through the cam 32. An end of the reset spring 315 is disposed within the mounting groove 3141, and the other end is fixed to a component inside the solid-state circuit breaker 100, and the end of the rotating shaft 5 extending through the cam 32 is located between the two ends of the reset spring 315. In a case that the operating handle 2 is switched from the closing state to the opening state, the linkage rod 311 in FIG. 8 moves downward, and the reset spring 315 is compressed by force. The operating handle 2 is switched from the opening state to the closing state, since the linkage rod 311 is not connected to the operating handle 2, the operating handle 2 cannot drive the linkage rod 311 to reset, the linkage rod 311 moves upward by the force released by the reset spring 315 and abuts against the operating handle 2.

Referring back to FIG. 1, the microswitch 4 includes a switch arm 41 and a switch contact 42 abutting against the switch arm 41. Referring to FIG. 6, the cam 32 includes a first arc surface 321, a second arc surface 322, and a pair of transition surfaces 323 disposed between the first arc surface 321 and the second arc surface 322. Arc centers of the first arc surface 321 and the arc centers of the second arc surface 322 are both located on the central axis of the rotating shaft 5, and a diameter of the first arc surface 321 is greater than that of the second arc surface 322.

In some embodiments, the first arc surface 321 of the cam 32 shown in FIGS. 1 to 4 is located below the second arc surface 322. With the above configuration, as shown in FIG. 1, in a case that the operating handle 2 is in the closing state, the switch arm 41 abuts against the second arc surface 322, but the switch arm 41 does not press the switch contact 42. Continuing to refer to FIG. 4, in a case that the operating handle 2 is rotated by the second angle from the closing state, the switch arm 41 abuts against the first arc surface 321, and the switch arm 41 presses the switch contact 42, such that the microswitch 4 is triggered.

Continuing to refer to FIGS. 1 to 4, the first arc surface 321 of the cam 32 can prevent the switch arm 41 of the microswitch 4 from exceeding a maximum stroke. It can be understood that in a case that the first arc surface 321 just abuts against the switch arm 41, even if the operating handle 2 continues to rotate, the switch arm 41 will not continue to press the switch contact 42, thereby avoiding deformation of the switch arm 41 of the microswitch 4.

Figure 9:
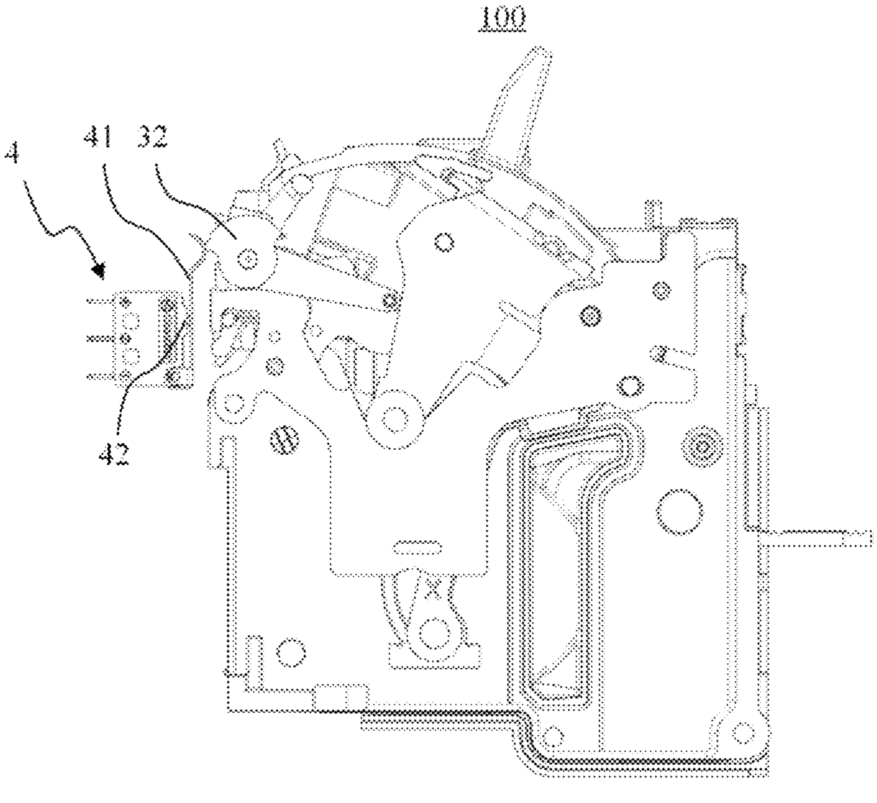
FIG. 9 shows a schematic structural diagram of a solid-state circuit breaker according to other embodiments of the present disclosure, in which the operating handle is in the closing state.
Figure 10:
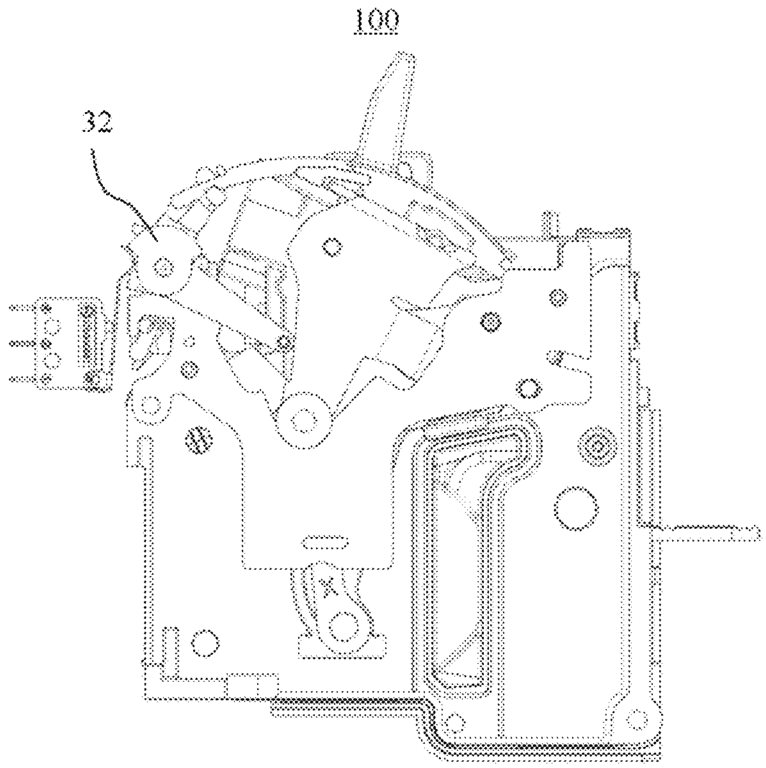
FIG. 10 shows a schematic structural diagram of a solid-state circuit breaker according to other embodiments of the present disclosure, in which the operating handle is rotated by a second angle from the closing state.
Figure 11:
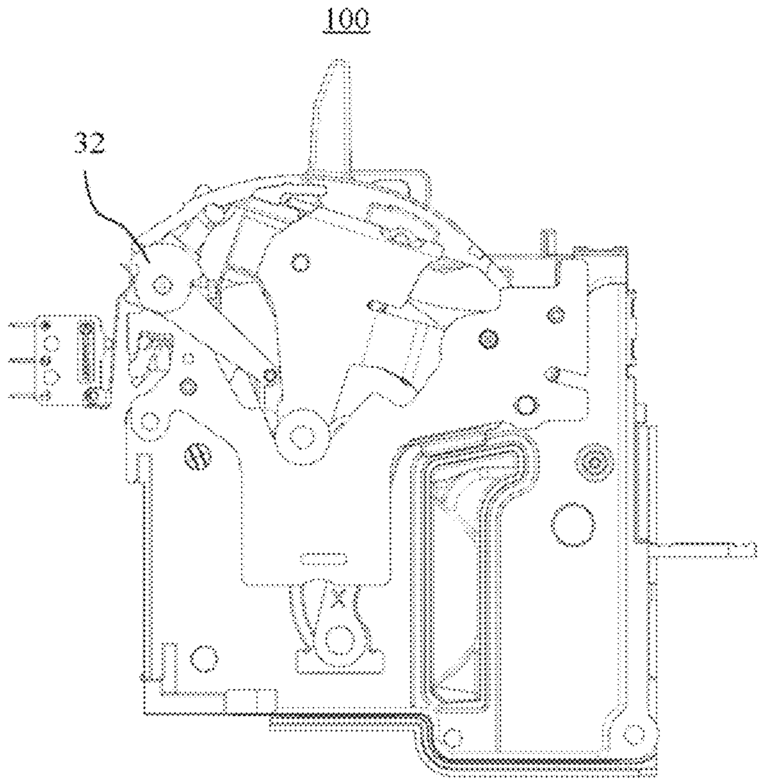
FIG. 11 shows a schematic structural diagram of a solid-state circuit breaker according to other embodiments of the present disclosure, in which the operating handle is rotated by a first angle from the closing state.
Figure 12:
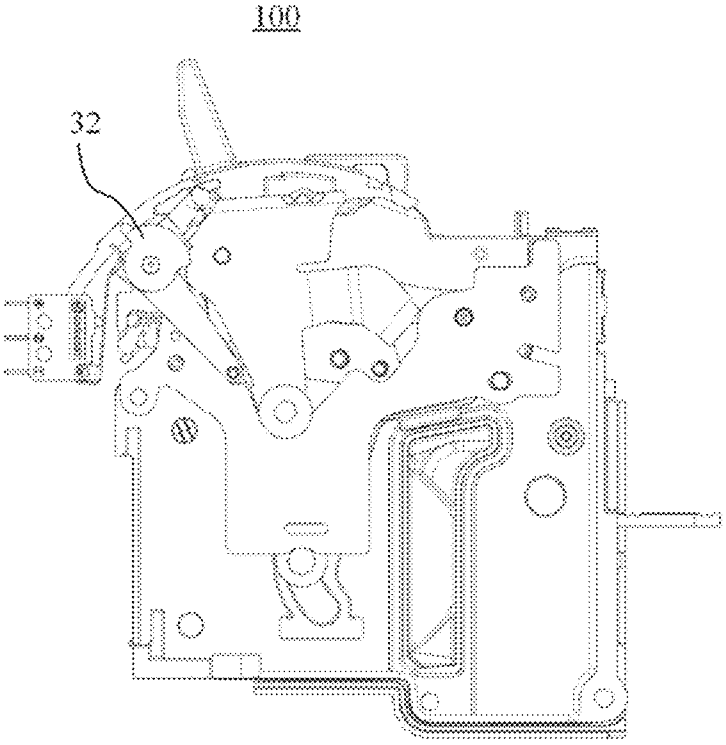
FIG. 12 shows a schematic structural diagram of a solid-state circuit breaker according to some other embodiments of the present disclosure, in which the operating handle is in the opening state.

In other embodiments, FIG. 9 shows a schematic structural diagram of the solid-state circuit breaker 100 according to other embodiments of the present disclosure, in which the operating handle 2 is in the closing state. FIG. 10 shows a schematic structural diagram of the solid-state circuit breaker 100 according to other embodiments of the present disclosure, in which the operating handle 2 is rotated by the second angle from the closing state. FIG. 11 shows a schematic structural diagram of the solid-state circuit breaker 100 according to other embodiments of the present disclosure, in which the operating handle 2 is rotated by the first angle from the closing state. FIG. 12 shows a schematic structural diagram of the solid-state circuit breaker 100 according to other embodiments of the present disclosure, in which the operating handle 2 is in the opening state. The operating handle 2 of the solid-state circuit breaker 100 in FIGS. 9 to 12 includes four different states among which the operating handle 2 may rotate from the closing state to the opening state. The operating handle 2 in FIG. 9 is in the closing state, in which the mechanical switch 6 is closed. The operating handle 2 in FIG. 10 is rotated by the second angle from the closing state, in which the microswitch 4 is triggered and transmits a signal to the MCU. The MCU receives the signal and opens the current in the circuit. The operating handle 2 in FIG. 11 is rotated by the first angle from the closing state, in which the mechanical switch 6 is opened. The operating handle 2 in FIG. 12 is in the opening state.

Figure 13:
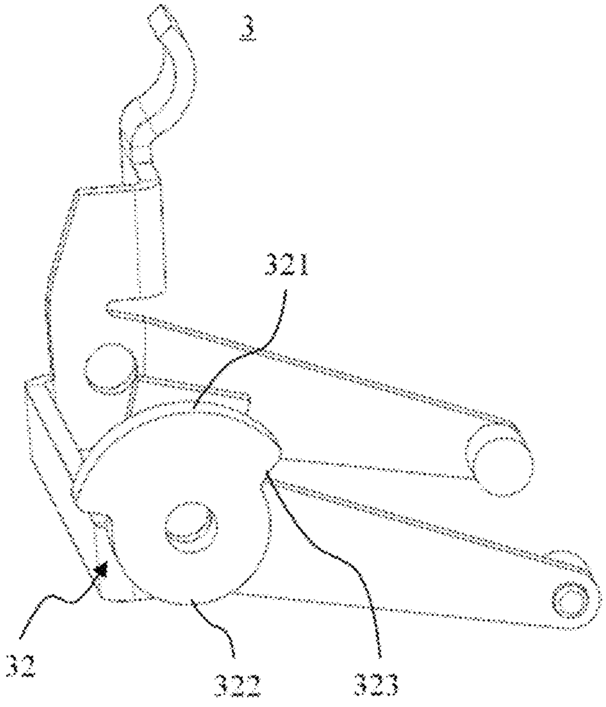
FIG. 13 shows a schematic structural diagram of the actuating assembly shown in FIGS. 9 to 12, in which the reset spring is not shown.

FIG. 13 shows a schematic structural diagram of the actuating assembly 3 shown in FIGS. 9 to 12, in which the reset spring 315 is not shown. In conjunction with FIGS. 9 to 13, the first arc surface 321 of the cam 32 is located above the second arc surface 322. As shown in FIG. 9, in a case that the operating handle 2 is in the closing state, the switch arm 41 abuts against the first arc surface 321, and the switch arm 41 presses the switch contact 42. Continuing to refer to FIG. 10, in a case that the operating handle 2 is rotated by the second angle from the closing state, the switch arm 41 abuts against the second arc surface 322, and the switch arm 41 releases the switch contact 42, such that the microswitch 4 is triggered.

It should be noted that in some embodiments, as shown in FIG. 13, the linkage part 31 may include a pair of linkage rods 311 spaced apart from each other and a connecting portion 312 disposed between the pair of linkage rods 311. Of course, in some embodiments, the linkage part 31 may also include only one linkage rod 311, which will not be repeated here.

The actuating assembly 3 and the microswitch 4 according to embodiments of the present disclosure can be applied to various solid-state circuit breakers 100 to accurately capture the position of the operating handle 2, such that the microswitch 4 can accurately open the circuit. It should be understood that the actuating assembly 3 and the microswitch 4 according to embodiments of the present disclosure can also be applied to other components, and embodiments of the present disclosure are not limited to this.

The above has described various embodiments of the present disclosure. The above description is exemplary, not exhaustive, and is not limited to the disclosed embodiments. Without departing from the scope and spirit of the described embodiments, many modifications and changes will be apparent to those of ordinary skill in the field. The choice of terms used herein is intended to best explain the principles, practical applications, or technical improvements in the market of each embodiment, or to enable other ordinary technicians in the field to understand the various embodiments disclosed herein.

What is claimed is:

1. A solid-state circuit breaker comprising:

a mounting side plate;

an operating handle disposed on the mounting side plate and being rotatable relative to the mounting side plate to switch between a closing state and an opening state;

a mechanical switch connected to the operating handle, wherein when the operating handle is rotated by a first angle from the closing state along a rotation direction of the operating handle, the operation handle is switched from the closing state to a first position between the closing state and the opening state, wherein the operating handle drives the mechanical switch to open when switched to the first position;

an actuating assembly disposed on the mounting side plate, wherein an end of the actuating assembly abuts against the operating handle, and the actuating assembly is rotatable relative to the mounting side plate under driving of the operating handle;

a microswitch abutting against another end of the actuating assembly away from the operating handle, wherein when the operating handle is rotated by a second angle from the closing state along the rotation direction of the operating handle, the operating handle is switched from the closing state to a second position between the closing state and the opening state, wherein the operating handle, when switched to the second position, drives the actuating assembly to rotate such that the microswitch is triggered by the actuating assembly, wherein the first angle is greater than the second angle; and a cam rotably connected to the mounting side plate and configured to abut against the microswitch, wherein the cam includes at least a first arc surface configured to abut against a switch arm of the microswitch, and wherein the first arc surface is configured to prevent a switch arm of the microswitch from exceeding a maximum stroke when the operating handle is rotated from the closing state to the opening state.

2. The solid-state circuit breaker of claim 1, wherein the first angle is greater than the second angle by at least 15 degrees to provide time for the microswitch to complete signal transmission before the mechanical switch opens, thereby avoiding generation of an electric arc at the mechanical switch.

3. The solid-state circuit breaker of claim 1, wherein the actuating assembly is configured to provide a direct mechanical coupling to transfer rotational movement of the operating handle to the microswitch.

4. The solid-state circuit breaker of claim 3, wherein the microswitch, when triggered by the actuating assembly, is configured to directly capture a position of the operating handle through the actuating assembly and open a circuit of the solid-state circuit breaker.

5. The solid-state circuit breaker of claim 1, wherein the actuating assembly comprises a linkage part that abuts against the operating handle, wherein the cam is disposed at an end of the linkage part near the microswitch, and wherein the cam abuts against the microswitch.

6. The solid-state circuit breaker of claim 5, wherein the solid-state circuit breaker further comprises a rotating shaft, and wherein the linkage part and the cam are rotatably connected to the mounting side plate through the rotating shaft.

7. The solid-state circuit breaker of claim 6, wherein the linkage part comprises a pair of linkage rods spaced apart from each other and a connecting portion disposed between the pair of linkage rods, wherein an abutting portion is disposed on sides of the pair of linkage rods close to each other, wherein the abutting portion abuts against the operating handle, wherein the cam is disposed at an end of a first linkage rod of the pair of linkage rods close to the microswitch, and wherein the cam is located on a side of the first linkage rod away from a second linkage rod of the pair of linkage rods.

8. The solid-state circuit breaker of claim 7, wherein the linkage part further comprises a mounting portion and a reset spring, wherein the mounting portion is disposed at an end of the second linkage rod near the microswitch and a mounting groove is disposed at an end of the mounting portion away from the cam, wherein the reset spring is arranged around an outer side of the rotating shaft, wherein an end of the reset spring is disposed within the mounting groove and another end of the reset spring is fixed inside the solid-state circuit breaker, and wherein reset spring is compressed when the operating handle is switched from the closing state to the opening state.

9. The solid-state circuit breaker of claim 6, wherein the linkage part comprises a linkage rod comprising a first side and a second side disposed opposite to each other, wherein an abutting portion is disposed on the first side, wherein the abutting portion abuts against the operating handle, and wherein the cam is disposed at an end of the linkage rod near the microswitch and is located on the second side.

10. The solid-state circuit breaker of claim 9, wherein the linkage part further comprises a mounting portion and a reset spring, wherein the mounting portion is disposed at an end of the linkage rod near the microswitch and extends along a direction pointing to the second side from the first side, wherein a mounting groove is disposed at an end of the mounting portion near the cam, wherein the reset spring is arranged around an outer side of the rotating shaft, wherein an end of the reset spring is disposed within the mounting groove and another end of the reset spring is fixed inside the solid-state circuit breaker, and wherein the reset spring is compressed when the operating handle is switched from the closing state to the opening state.

11. The solid-state circuit breaker of claim 6, wherein the cam comprises a second arc surface and one or more transition surfaces disposed between the first arc surface and the second arc surface, wherein arc centers of the first arc surface and the second arc surface are both located on a central axis of the rotating shaft, and wherein a diameter of the first arc surface is greater than a diameter of the second arc surface.

12. The solid-state circuit breaker of claim 11, wherein the microswitch comprises a switch contact abutting against the switch arm, wherein the switch arm abuts against the second arc surface when the operating handle is in the closing state, and when the operating handle is rotated by the second angle from the closing state, the switch arm abuts against the first arc surface and presses the switch contact, such that the microswitch is triggered.

13. The solid-state circuit breaker of claim 11, wherein the microswitch comprises a switch contact abutting against the switch arm, wherein the switch arm abuts against the first arc surface and presses the switch contact when the operating handle is in the closing state, and when the operating handle is rotated by the second angle from the closing state, the switch arm abuts against the second arc surface and releases the switch contact, such that the microswitch is triggered.

14. A switching device configured to protect electrical circuits, the switching device comprising:
- a mounting side plate;
- an operating handle disposed on the mounting side plate and rotatable relative to the mounting side plate to switch between a closing state and an opening state;
- a mechanical switch connected to the operating handle, wherein when the operating handle is rotated by a first angle from the closing state along a rotation direction of the operating handle, the operation handle is switched from the closing state to the opening state such that the operating handle drives the mechanical switch to open;
- an actuating assembly disposed on the mounting side plate and configured to abut against the operation handle via one end of the actuating assembly, the actuating assembly including a linkage part and a cam that are rotatably connected to the mounting side plate, wherein the linkage part abuts against the operating handle, and the actuating assembly is rotatable relative to the mounting side plate when driven by the operating handle; and
- a microswitch abutting against another end of the actuating assembly away from the operating handle, wherein when the operating handle is rotated by a second angle from the closing state along the rotation direction of the operating handle switched from the closing state to the opening state, the operating handle drives the actuating assembly to rotate such that the microswitch is triggered by the actuating assembly, wherein the first angle is greater than the second angle,
- wherein the linkage part comprises a first linkage rod, a second linkage rod spaced apart from the first linkage rod, and a connecting portion disposed between the first and second linkage rods, wherein an abutting portion is disposed on sides of the first and second linkage rods and abuts against the operating handle, and wherein the cam is disposed at an end of the first linkage rod and is located on a side of the first linkage rod away from the second linkage rod.

15. The switching device of claim 14, wherein the mechanical switch comprises a movable contact assembly and a static contact assembly, and wherein the operating handle is connected to the movable contact assembly through an elastic part and a connecting rod.

16. The switching device of claim 14, further comprising:
- rotating holes provided in the linkage part, the cam, and the mounting side plate, wherein the rotating holes are in respective communication with one another; and
- a rotating shaft disposed within at least one of the rotating holes such that linkage part and the cam are rotatably connected to the mounting side plate through the rotating shaft.

17. The switching device of claim 16, wherein the rotating shaft includes a first end away from the cam, wherein the linkage part includes a reset spring arranged around an outer side of the first end of the rotating shaft, and wherein the first end extends through the second linkage rod and is located between two ends of the reset spring.

18. The switching device of claim 14, wherein, when the operating handle is in the closing state, the movable contact assembly and the static contact assembly are connected to one another such that the mechanical switch is closed.

19. The switching device of claim 18, wherein the operating handle is configured, when rotated by the first angle from the closing state, to movably drive the movable contact assembly away from the static contact assembly and separate from the static contact assembly, causing the mechanical switch to open.

20. An actuating assembly for a solid-state circuit breaker having a mounting side plate, an operating handle disposed on the mounting side plate and rotatable along a rotation direction to switch between a closing state and an opening state, and a mechanical switch connected to the operating handle, wherein the operating handle is configured to drive the mechanical switch to open when the operating handle is rotated by a first angle from the closing state along the rotation direction of the operating handle, the actuating assembly comprising:
- a linkage part configured to abut against the operating handle; and
- a cam disposed at a first end of the linkage part and configured to abut against a microswitch of the solid-state circuit breaker, the microswitch abutting against an end of the actuating assembly away from the operating handle, wherein when the operating handle is rotated by a second angle from the closing state along the rotation direction towards the opening state, the actuating assembly is rotatably driven by the operating handle such that the actuating assembly triggers the microswitch, wherein the first angle is greater than the second angle, wherein the linkage part and the cam are rotatably connected to the mounting side plate through a rotating shaft of the solid-state circuit breaker, wherein the cam includes a first arc surface, a second arc surface having a smaller diameter than the first arc surface, and at least one transition surface disposed between the first and second arc surfaces, and wherein arc centers of the first and second arc surfaces are both located on a central axis of the rotating shaft.

* * * * *